(12) United States Patent
Jones et al.

(10) Patent No.: US 10,934,930 B2
(45) Date of Patent: *Mar. 2, 2021

(54) AUXILIARY POWER UNIT WITH VARIABLE SPEED RATIO

(71) Applicant: PRATT & WHITNEY CANADA CORP., Longueuil (CA)

(72) Inventors: Anthony Jones, San Diego, CA (US); Andre Julien, Ste-Julie (CA); David Menheere, Norval (CA); Jean Thomassin, Ste-Julie (CA); Richard Ullyott, St-Bruno (CA); Daniel Van Den Ende, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/284,381

(22) Filed: Feb. 25, 2019

(65) Prior Publication Data

US 2019/0186351 A1  Jun. 20, 2019

Related U.S. Application Data

(63) Continuation of application No. 15/227,496, filed on Aug. 3, 2016, now Pat. No. 10,240,521.

(Continued)

(51) Int. Cl.
*F02B 53/14* (2006.01)
*B64D 41/00* (2006.01)
(Continued)

(52) U.S. Cl.
CPC .............. *F02B 53/14* (2013.01); *B64D 41/00* (2013.01); *F02B 33/40* (2013.01); *F02B 37/10* (2013.01);
(Continued)

(58) Field of Classification Search
CPC .......... F02B 53/14; F02B 33/40; F02B 37/10; F02B 37/24; F02B 39/10; F02B 39/12;
(Continued)

(56) References Cited

U.S. PATENT DOCUMENTS 2,356,557 A * 8/1944 Anxionnaz ............. F02C 3/055
60/248
2,385,366 A * 9/1945 Lysholm ................. F02C 3/055
60/248

(Continued)

FOREIGN PATENT DOCUMENTS

EP    1990517    11/2008
EP    2631182    8/2013

*Primary Examiner* — Thai Ba Trieu
(74) *Attorney, Agent, or Firm* — Norton Rose Fulbright Canada LLP

(57) ABSTRACT

An auxiliary power unit for an aircraft includes a rotary intermittent internal combustion engine drivingly engaged to an engine shaft, a turbine section having an inlet in fluid communication with an outlet of the engine(s), the turbine section including at least one turbine compounded with the engine shaft, and a compressor having an inlet in fluid communication with an environment of the aircraft and an outlet in fluid communication with a bleed duct for providing bleed air to the aircraft, the compressor having a compressor rotor connected to a compressor shaft, the compressor shaft drivingly engaged to the engine shaft. The driving engagement between the compressor shaft and the engine shaft is configurable to provide at least two alternate speed ratios between the compressor shaft and the engine shaft.

19 Claims, 10 Drawing Sheets

Related U.S. Application Data

(60) Provisional application No. 62/202,297, filed on Aug. 7, 2015, provisional application No. 62/202,275, filed on Aug. 7, 2015.

(51) Int. Cl.
| | | |
|---|---|---|
| *F02B 33/40* | (2006.01) | |
| *F02B 37/10* | (2006.01) | |
| *F02B 37/24* | (2006.01) | |
| *F02B 39/10* | (2006.01) | |
| *F02B 39/12* | (2006.01) | |
| *F02B 61/06* | (2006.01) | |
| *F02B 63/04* | (2006.01) | |
| *F02C 6/12* | (2006.01) | |
| *F02C 7/32* | (2006.01) | |
| *F02C 7/36* | (2006.01) | |
| *F02B 53/00* | (2006.01) | |

(52) U.S. Cl.
CPC .............. *F02B 37/24* (2013.01); *F02B 39/10* (2013.01); *F02B 39/12* (2013.01); *F02B 61/06* (2013.01); *F02B 63/04* (2013.01); *F02C 6/12* (2013.01); *F02C 7/32* (2013.01); *F02C 7/36* (2013.01); *F02B 2053/005* (2013.01); *F05D 2220/50* (2013.01); *F05D 2260/40* (2013.01); *Y02T 10/12* (2013.01); *Y02T 50/40* (2013.01); *Y02T 50/60* (2013.01)

(58) Field of Classification Search
CPC .... F02B 61/06; F02B 63/04; F02B 2053/005; F02C 6/12; F02C 7/32; F02C 7/36; F05D 2220/50; F05D 2220/40; B64D 41/00; Y02T 10/144; Y02T 50/44; Y02T 50/671
USPC ........ 60/607–609, 39.281, 9.6, 39.37, 39.38, 60/39.39, 39.45, 39.6; 290/51
See application file for complete search history.

(56) References Cited

U.S. PATENT DOCUMENTS

| | | | |
|---|---|---|---|
| 2,465,099 A * | 3/1949 | Johnson | F02C 3/055 60/606 |
| 3,166,902 A * | 1/1965 | Meyer | F02C 9/34 60/39.281 |
| 4,452,043 A | 6/1984 | Wallace | |
| 4,514,976 A | 5/1985 | Christoff | |
| 4,798,257 A | 1/1989 | Kawamura | |
| 4,800,726 A | 1/1989 | Okada et al. | |
| 4,815,277 A | 3/1989 | Vershure, Jr. et al. | |
| 4,815,282 A * | 3/1989 | Wilkinson | F02C 6/12 60/605.1 |
| 4,989,410 A | 2/1991 | Smith | |
| 4,996,839 A * | 3/1991 | Wilkinson | F02B 39/12 60/605.1 |
| 5,056,315 A | 10/1991 | Jenkins | |
| 5,385,011 A | 1/1995 | Stewart, Jr. | |
| 5,692,372 A | 12/1997 | Whurr | |
| 7,364,116 B2 | 4/2008 | Nguyen et al. | |
| 7,485,981 B2 * | 2/2009 | Schwarz | F02C 7/32 290/51 |
| 7,490,594 B2 | 2/2009 | Van Dyne et al. | |
| 7,690,189 B2 * | 4/2010 | Schwarz | F02C 6/08 60/224 |
| 7,753,036 B2 | 7/2010 | Lents et al. | |
| 7,775,044 B2 | 8/2010 | Julien et al. | |
| 8,015,795 B2 * | 9/2011 | Schwarz | F02C 6/08 60/224 |
| 8,118,253 B1 | 2/2012 | Casado Abarquero et al. | |
| 8,495,877 B2 | 7/2013 | Weyer et al. | |
| 9,027,345 B2 | 5/2015 | Julien | |
| 9,048,765 B2 | 6/2015 | Dobbs | |
| 9,194,232 B2 | 11/2015 | Bolduc et al. | |
| 9,759,126 B2 | 9/2017 | Julien | |
| 9,869,240 B2 | 1/2018 | Lamarre et al. | |
| 10,240,521 B2 * | 3/2019 | Jones | F02B 37/24 |
| 10,253,687 B2 * | 4/2019 | Jones | F02B 53/14 |
| 2009/0088063 A1 | 4/2009 | Schwarz | |
| 2009/0286651 A1 | 11/2009 | Tanaka et al. | |
| 2013/0151039 A1 | 6/2013 | Haillot | |
| 2013/0214091 A1 | 8/2013 | Hillel | |
| 2014/0260295 A1 | 9/2014 | Ullyott et al. | |
| 2015/0275749 A1 | 10/2015 | Thomassin | |
| 2016/0047298 A1 | 2/2016 | Lofgren | |
| 2016/0061053 A1 | 3/2016 | Thomassin | |
| 2017/0036768 A1 * | 2/2017 | Stieger | B64D 41/00 |
| 2017/0036773 A1 * | 2/2017 | Jones | B64D 41/00 |
| 2017/0037775 A1 | 2/2017 | Jones et al. | |
| 2018/0058333 A1 * | 3/2018 | Foutch | F02C 7/32 |
| 2019/0233123 A1 * | 8/2019 | Sharpe | B64D 41/00 |

* cited by examiner

AUXILIARY POWER UNIT WITH VARIABLE SPEED RATIO

CROSS-REFERENCE TO RELATED APPLICATIONS

This application is a continuation of U.S. application Ser. No. 15/227,496 filed Aug. 3, 2016, which claims priority from U.S. application No. 62/202,297 and U.S. application No. 62/202,275, both filed Aug. 7, 2015, the entire contents of all of which are incorporated by reference herein.

TECHNICAL FIELD

The application relates generally to compound engine assemblies and, more particularly, to such assemblies used as auxiliary power units (APU).

BACKGROUND OF THE ART

Aircraft secondary power in flight is generally provided by a main engine (prime mover engine), for example by extracting bleed air from the main engine compressors and by extracting shaft power from the main engine shaft for driving generators and hydraulic pumps. The bleed air is typically used for cabin pressurization and or de-icing. The shaft power is typically used for electrical generation and hydraulics. Secondary power extraction from the main engine, particularly when obtained in conditions of reduced thermal efficiency for example during at part load, can represent a significant portion of fuel burn.

Traditional gas turbine engine auxiliary power units (i.e. including an engine core with a combustor) typically have a thermal efficiency which is much lower than that of the main engine at high power, and are optimized to generate secondary power while on ground. Accordingly secondary power generated with such gas turbine engine auxiliary power units during flight would increase fuel burn, thus requiring the secondary power during flight to be generated by the main engine.

SUMMARY

In one aspect, there is provided an auxiliary power unit for an aircraft, comprising: a rotary intermittent internal combustion engine drivingly engaged to an engine shaft; a turbine section having an inlet in fluid communication with an outlet of the rotary intermittent internal combustion engine, the turbine section including at least one turbine compounded with the engine shaft; and a compressor having an inlet in fluid communication with an environment of the aircraft and an outlet in fluid communication with a bleed duct for providing bleed air to the aircraft, the compressor having a compressor rotor connected to a compressor shaft, the compressor shaft drivingly engaged to the engine shaft, the driving engagement between the compressor shaft and the engine shaft configurable to provide at least two alternate speed ratios between the compressor shaft and the engine shaft.

In another aspect, there is provided an auxiliary power unit for an aircraft, comprising: a plenum in fluid communication with an environment of the aircraft through a main inlet; a rotary intermittent internal combustion engine drivingly engaged to an engine shaft; a turbine having an inlet in fluid communication with an outlet of the rotary intermittent internal combustion engine, the turbine compounded with the rotary intermittent internal combustion engine; a first compressor having an inlet in fluid communication with the plenum and an outlet in fluid communication with an inlet of the rotary intermittent internal combustion engine; a second compressor having an inlet in fluid communication with the plenum and an outlet in fluid communication with a bleed duct for providing bleed air to the aircraft; and a compressor shaft connected to a rotor of at least one of the first and second compressors, the compressor shaft drivingly engaged to the engine shaft, the driving engagement between the compressor shaft and the engine shaft configurable to provide at least two alternate speed ratios between the compressor shaft and the engine shaft.

DESCRIPTION OF THE DRAWINGS

Reference is now made to the accompanying figures in which.

DETAILED DESCRIPTION

The present description includes compound engine assembly auxiliary power units for providing supplementary ground and flight pneumatic and/or electric power for airborne auxiliary power unit applications. In a particular embodiment, the auxiliary power units are configured to directly replace a traditional gas turbine engine auxiliary power unit and perform in a more efficient manner, with power/weight and power/volume properties meeting the requirements for airborne application. Application to fixed or mobile ground power units is also possible.

In a particular embodiment, the auxiliary power unit is configured to be able to provide full time and part time in-flight operation. The auxiliary power unit may thus have an increased range of outputs to adapt to ground and in-flight use, as compared to a traditional gas turbine engine auxiliary power unit.

Figure 1:
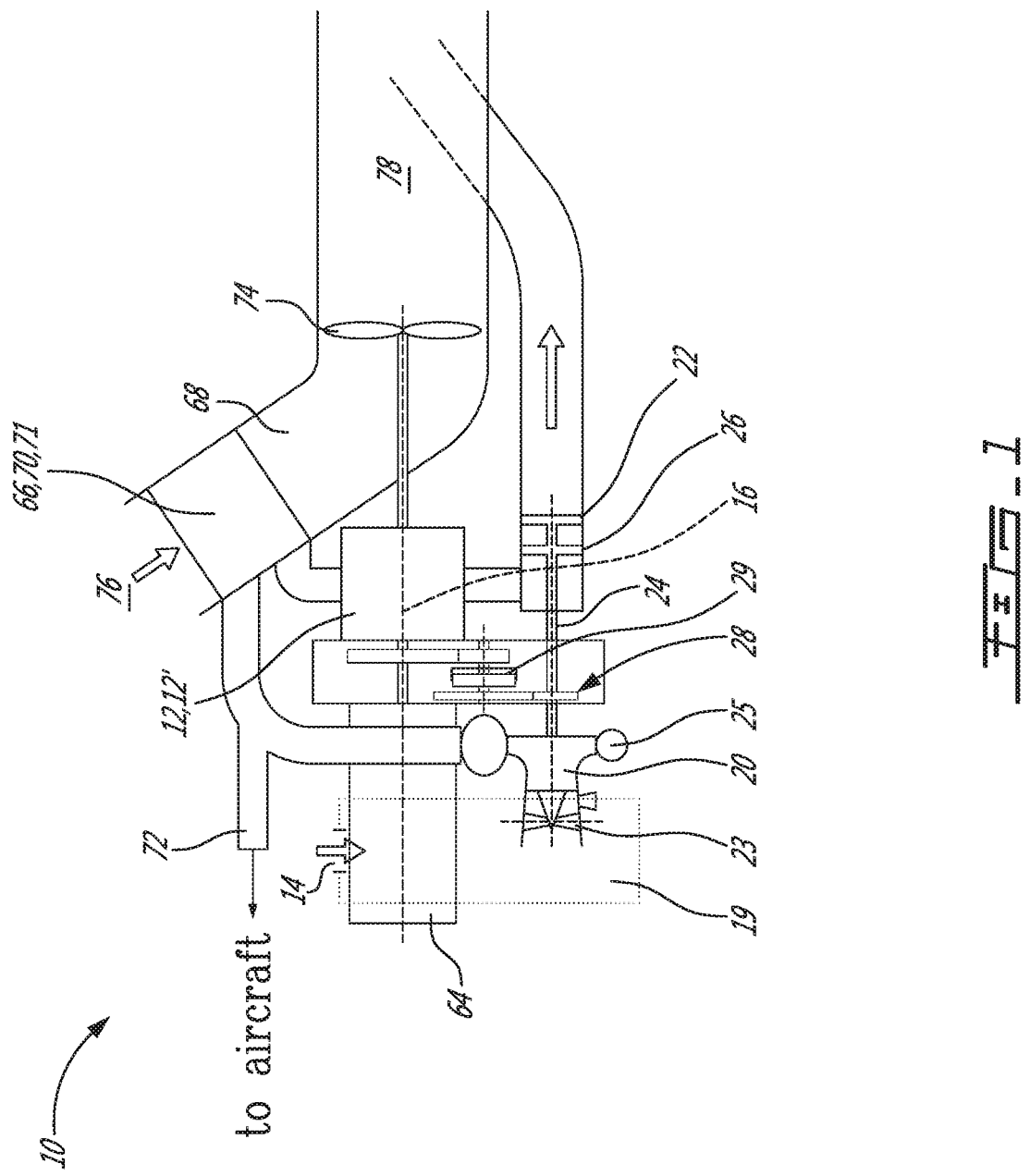
FIG. 1 is a schematic view of an auxiliary power unit in accordance with a particular embodiment.

Referring to FIG. 1, an auxiliary power unit 10 in accordance with a particular embodiment is generally shown. The auxiliary power unit 10 includes an engine core 12' including one or more intermittent internal combustion engines 12 engaged to a common shaft 16. In a particular embodiment, the intermittent internal combustion engine(s) 12 is/are rotary internal combustion engine(s), for example Wankel engine(s); it is however understood that other types of intermittent internal combustion engines may alternately be used.

Figure 2:
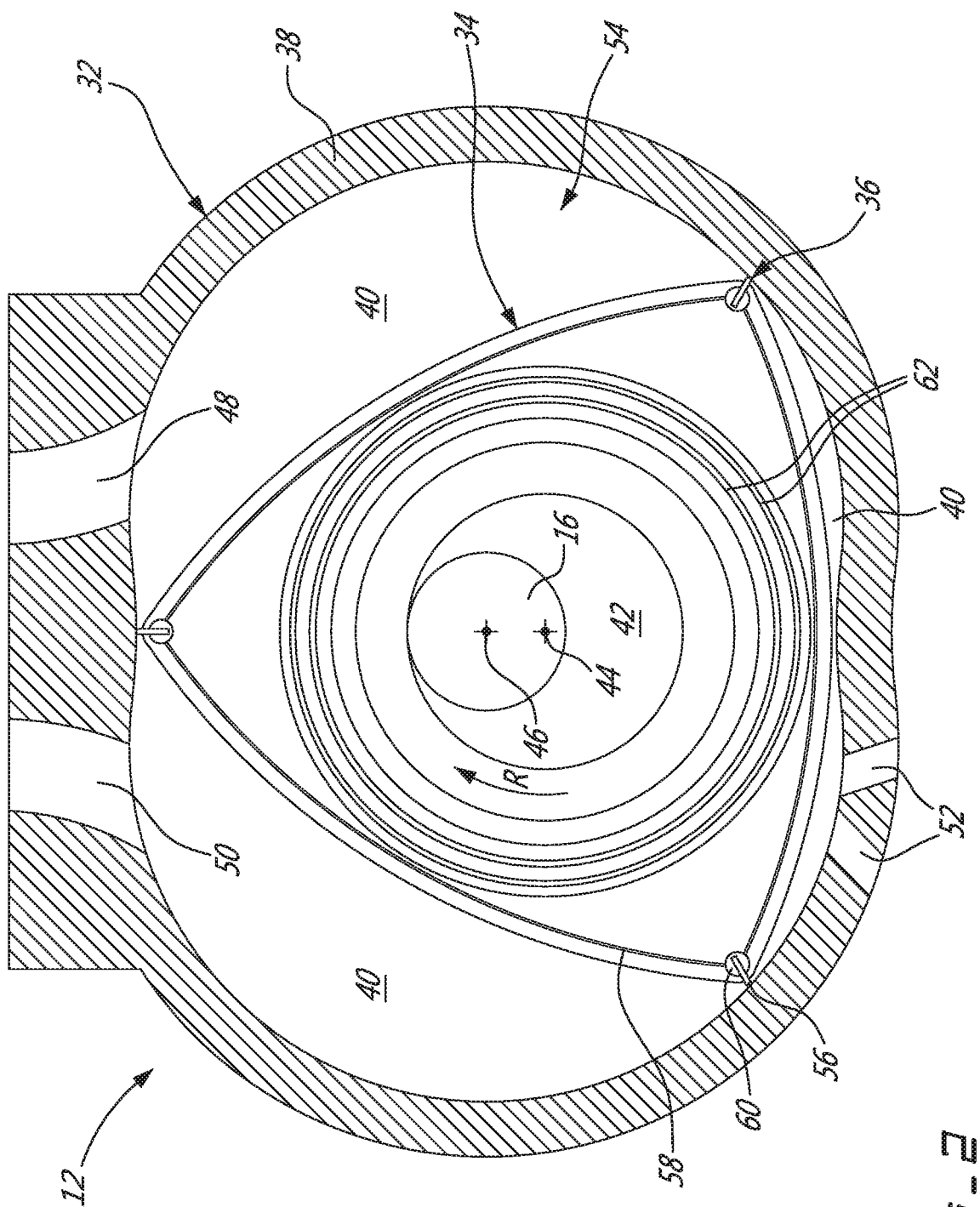
FIG. 2 is a schematic cross-sectional view of a rotary engine which can be used on the engine assembly of FIG. 1.

Referring to FIG. 2, an example of a Wankel engine which may be used in the engine core 12' is shown. It is understood that the configuration of the engine(s) 12, e.g. placement of ports, number and placement of seals, etc., may vary from that of the embodiment shown. The engine 12 comprises a housing 32 defining a rotor cavity having a profile defining two lobes, which is preferably an epitrochoid. A rotor 34 is received within the rotor cavity. The rotor defines three circumferentially-spaced apex portions 36, and a generally triangular profile with outwardly arched sides. The apex portions 36 are in sealing engagement with the inner surface of a peripheral wall 38 of the housing 32 to form and separate three working chambers 40 of variable volume between the rotor 34 and the housing 32. The peripheral wall 38 extends between two axially spaced apart end walls 54 to enclose the rotor cavity.

The rotor 34 is engaged to an eccentric portion 42 of an output shaft 16 to perform orbital revolutions within the rotor cavity. The output shaft 16 performs three rotations for each orbital revolution of the rotor 34. The geometrical axis 44 of the rotor 34 is offset from and parallel to the axis 46 of the housing 32. During each orbital revolution, each chamber 40 varies in volume and moves around the rotor cavity to undergo the four phases of intake, compression, expansion and exhaust.

An intake port 48 is provided through the peripheral wall 38 for admitting compressed air into one of the working chambers 40. An exhaust port 50 is also provided through the peripheral wall 38 for discharge of the exhaust gases from the working chambers 40. Passages 52 for a spark plug, glow plug or other ignition mechanism, as well as for one or more fuel injectors of a fuel injection system (not shown) are also provided through the peripheral wall 38. Alternately, the intake port 48, the exhaust port 50 and/or the passages 52 may be provided through the end or side wall 54 of the housing. A subchamber (not shown) may be provided in communication with the chambers 40, for pilot or pre injection of fuel for combustion.

For efficient operation the working chambers 40 are sealed by spring-loaded peripheral or apex seals 56 extending from the rotor 34 to engage the inner surface of the peripheral wall 38, and spring-loaded face or gas seals 58 and end or corner seals 60 extending from the rotor 34 to engage the inner surface of the end walls 54. The rotor 34 also includes at least one spring-loaded oil seal ring 62 biased against the inner surface of the end wall 54 around the bearing for the rotor 34 on the shaft eccentric portion 42.

The fuel injector(s) of the engine 12, which in a particular embodiment are common rail fuel injectors, communicate with a source of Heavy fuel (e.g. diesel, kerosene (jet fuel), equivalent biofuel), and deliver the heavy fuel into the engine 12 such that the combustion chamber is stratified with a rich fuel-air mixture near the ignition source and a leaner mixture elsewhere.

Referring back to FIG. 1, the auxiliary power unit 10 includes a supercharger compressor 20 compressing the air to feed the engine core 12'. Air from the environment of the aircraft enters a plenum 19 from the main inlet 14 of the auxiliary power unit 10. This plenum 19 feeds the compressor 20 so that an inlet of the compressor 20 is in fluid communication with the environment of the aircraft. The compressor 20 optionally has variable inlet guide vanes 23 for flow control and/or a variable diffuser 25. In a particular embodiment, the variable diffuser 25 provides a low flow high pressure mode if the compressor 20 is used to provide air to the aircraft when the engine core 12' is shut down.

The outlet of the compressor 20 is in fluid communication with the inlet of the engine core 12', in a particular embodiment through a heat exchanger 66: the compressor 20 thus delivers air through the heat exchanger 66 defining an intercooler and to the inlet of the engine core 12', for example to the intake port 48 of each rotary engine 12. In a particular embodiment, the compressor 20 is located in proximity of the intercooler 66 for minimum ducting loss and weight. In the embodiment shown, the intercooler 66 is received in a cooling air duct 68 receiving air for example from a compartment 76 of the auxiliary power unit 10, so that cooling air may circulate through the intercooler 66 in heat exchange relationship with the compressed air fed to the engine core 12'. Alternately, the intercooler 66 may be cooled through an intermediate fluid link to a main engine cooler 70 through which the used coolant from the engine core 12' is circulated. The cooled compressed air is delivered to the engine core 12', for example at a temperature of 250° F. or less for an engine core 12' including rotary engine(s) 12.

In the embodiment shown, the supercharger compressor 20 also provides bleed air for the aircraft. Air for the aircraft system is bled off before the intercooler 66, for example through a bleed air duct 72 as shown. In a particular embodiment, a shut off valve (not shown) is provided upstream of the intercooler 66.

In the engine core 12' air is mixed with fuel and combusted to provide power and a residual quantity of intermediate pressure exhaust gas. The outlet of the engine core 12' (e.g. exhaust port 50 of each engine 12) is in fluid communication with an inlet of a turbine section, so that the exhaust gases from the engine core 12' are expanded in the turbine section. The turbine section has one or more turbines 26, 22 compounded with the engine core 12'. In a particular embodiment, the turbine section includes a first stage turbine 26 having an outlet in fluid communication with an inlet of a second stage turbine 22, with the turbines 26, 22 having different reaction ratios from one another. The degree of reaction of a turbine can be determined using the temperature-based reaction ratio (equation 1) or the pressure-based reaction ratio (equation 2), which are typically close to one another in value for a same turbine, and which characterize the turbine with respect to "pure impulse" or "pure reaction" turbines:

$$\text{Reaction }(T) = \frac{(t_{S3} - t_{S5})}{(t_{S0} - t_{S5})} \quad (1)$$

$$\text{Reaction }(P) = \frac{(P_{S3} - P_{S5})}{(P_{S0} - P_{S5})} \quad (2)$$

where t is temperature and P is pressure, s refers to a static port, and the numbers refers to the location the temperature or pressure is measured: 0 for the inlet of the turbine vane (stator), 3 for the inlet of the turbine blade (rotor) and 5 for the exit of the turbine blade (rotor); and where a pure impulse turbine would have a ratio of 0 (0%) and a pure reaction turbine would have a ratio of 1 (100%).

In a particular embodiment, the first stage turbine 26 is configured to take benefit of the kinetic energy of the pulsating flow exiting the core engine(s) 12 while stabilizing the flow and the second stage turbine 22 is configured to extract energy from the remaining pressure in the flow. Accordingly, in a particular embodiment the first stage turbine 26 has a lower reaction ratio (i.e. lower value) than that of the second stage turbine 22. In a particular embodiment, the first stage turbine 26 has a reaction ratio of 0.25 or lower (temperature or pressure based) or of 0.2 or lower (temperature or pressure based), and the second stage turbine 22 a reaction ratio higher than 0.25 (temperature or pressure based) and/or is a medium reaction pressure turbine. Other values are also possible.

The compressor 20 may be driven by one or more of the turbines 26, 22 and/or the engine core 12; in the embodiment shown, the first and second stage turbines 26, 22 and compressor 20 are coupled to the same shaft 24, i.e. rotor(s) of the compressor 20, the first stage turbine 26 and the second stage turbine 22 are connected to the same compressor shaft 24.

In the embodiment shown, the first and second stage turbines 26, 22 are both compounded with the engine core 12' by having the compressor and engine shafts 24, 16 coupled through a transmission 28 defining two (or more) speed ratios between the compressor shaft 24 and the engine shaft 16, which in a particular embodiment provides a high speed, high pressure range for altitude operation and a low speed range for ground and low altitude use. The driving engagement between the compressor shaft 24 and the engine shaft 16 is thus configurable to provide at least two alternate speed ratios between the shafts 24, 16.

In the embodiment shown, the driving engagement of the transmission 28 is configured to provide two alternate, different discrete speed ratios between the compressor shaft 24 and the engine shaft 16, through an epicyclic type gear stage with a friction brake/clutch and lock 29 to allowing for the two speed ratio operation. Depending on the particular design of the transmission 28, the auxiliary power unit 10 could shift by cycling through a low transmission power condition and effect the lock unlock, or the transmission 28 could require for the auxiliary power unit 10 to be shut down to change the speed ratio and be re-started after shifting the transmission 28 to the different speed ratio.

The main engine liquid cooler 70, the intercooler 66, and an engine oil cooler 71 are mounted close to the engine core 12', for example in the cooling air duct 68 on a frame attached to the engine core 12'; the coolers 66, 70, 71 may be mounted in series or in parallel. A fan 74 is located in an exhaust duct 78 in fluid communication with and downstream of the cooling air duct 68 to drive ("pull") airflow from the engine compartment 76 through the cooling air duct 68 and the coolers 66, 70, 71 and into the exhaust duct 78, where exhaust from the turbines 26, 22 is also discharged downstream of the fan 74. In the embodiment shown, the fan 74 is mechanically driven by the engine core 12', for example through a direct engagement with the engine shaft 16 such as to rotate at a same speed. Alternately, the fan 74 may be driven through a transmission (whether transmission 28 or through a separate transmission), or be electrically or hydraulically driven by a motor obtaining power directly or indirectly from the engine core 12'.

In a particular embodiment, an aircraft generator 64 is directly driven by the engine core 12', for example the engine core 12' including rotary engine(s) 12 and with the engine shaft 16 rotating at 8000 rpm. Alternately, the aircraft generator 64 may be driven through step up gearing by the transmission 28, which may make the generator 64 more compact. The generator 64 may be a variable speed generator, enabling to change the rotational speed of the engine core 12' in correspondence with different required loads.

Figure 3:
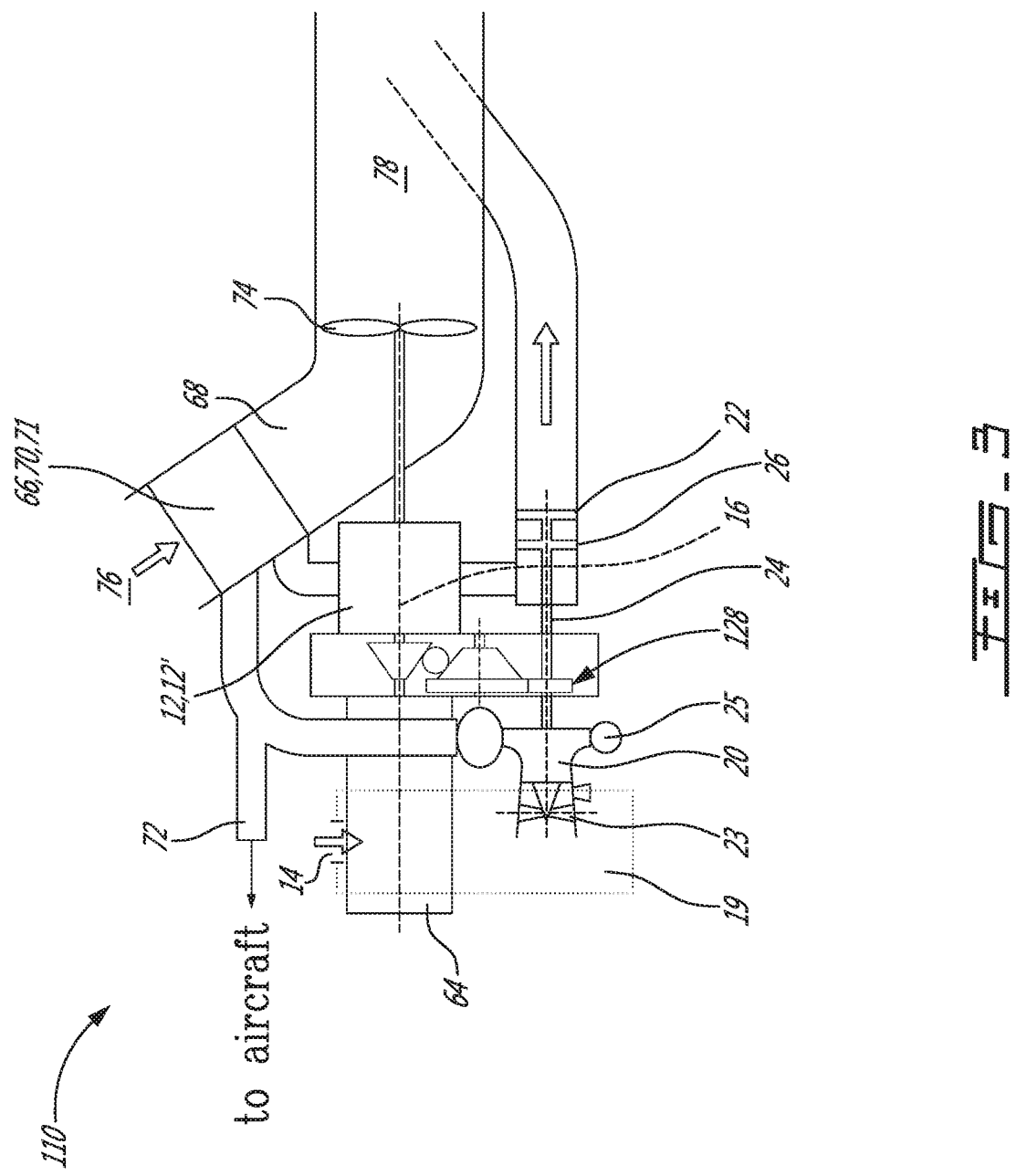
FIG. 3 is a schematic view of an auxiliary power unit in accordance with another particular embodiment.

FIG. 3 shows an auxiliary power unit 110 in accordance with another embodiment, where elements similar to that of the embodiment of FIG. 1 are identified with the same reference numerals and will not be further described herein.

In this embodiment, the transmission 128 between the compressor shaft 24 and the engine shaft 16 is a continuously variable transmission, and accordingly the driving engagement between the compressor shaft 24 and the engine shaft 16 is configured to provide a plurality of different speed ratios between the shafts 24, 16. In a particular embodiment, such a configuration provides better optimization capability than the embodiment of FIG. 1. In a particular embodiment, the continuously variable transmission 128 is in the low speed area of the gearbox associated with the engine (e.g. 8000 rpm for a rotary engine core) and in a configuration where the engine core/turbine work-split minimizes the power to be transmitted via the continuously variable transmission for efficiency, heat generation and weight reasons.

Figure 4:
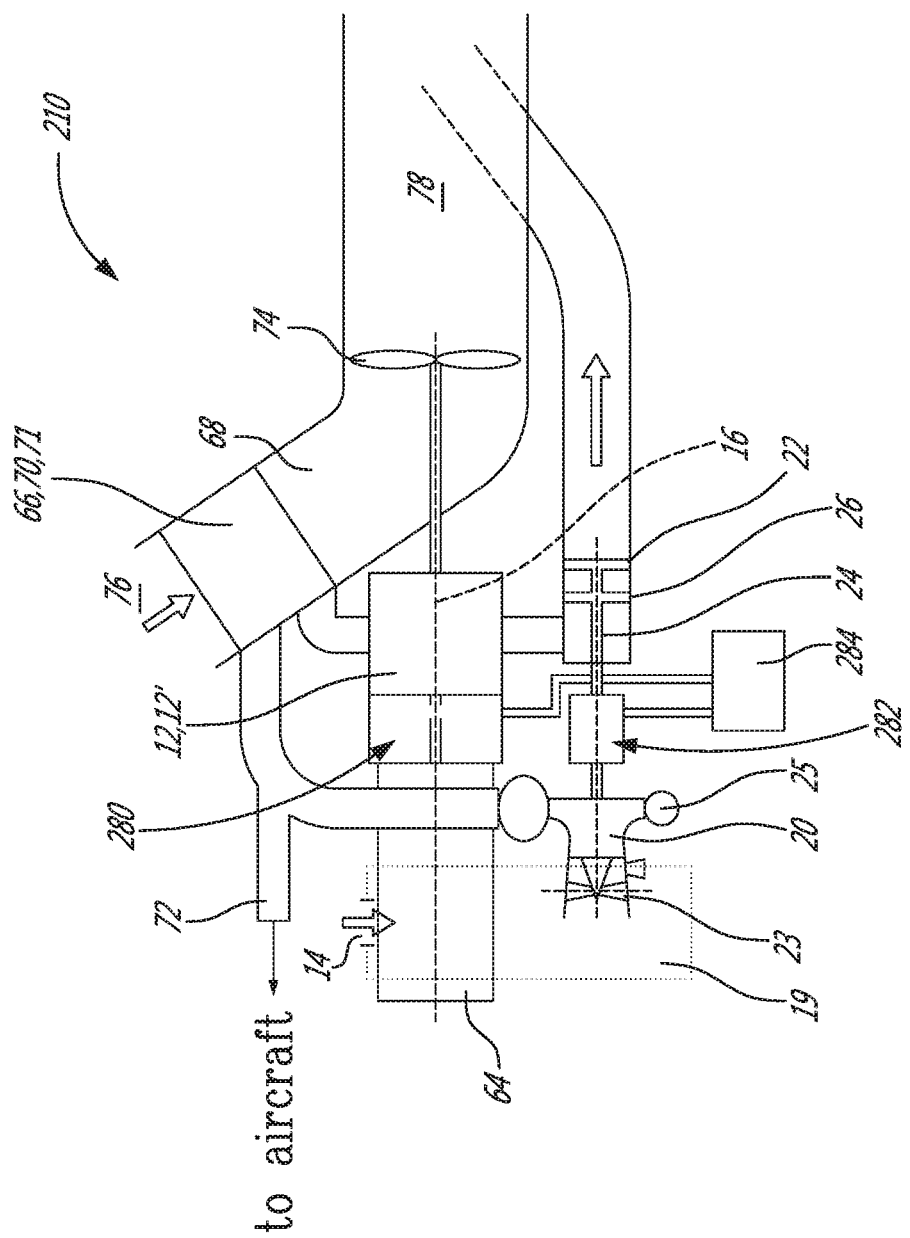
FIG. 4 is a schematic view of an auxiliary power unit in accordance with another particular embodiment.

FIG. 4 shows an auxiliary power unit 210 in accordance with another embodiment, where elements similar to that of the embodiment of FIG. 1 are identified with the same reference numerals and will not be further described herein.

In this embodiment, engine shaft 16 is also engaged to a transfer motor/generator 280 (e.g. high speed motor/generator), which may transfer power away from the engine shaft 16 or temporarily to the engine shaft 16 if needed. It can serve as a starter. Alternately, this power transfer functionality may be integrated with the aircraft generator 64. However, in a particular embodiment separate motor/generators 64, 280 allow for improved system segregation and failure tolerance. In the embodiment shown, the transmission 28 is omitted. Alternately, a transmission may be provided between the engine core and the transfer motor/generator 280.

Another generator/motor 282 (e.g. high speed brushless generator/motor) is provided on the compressor shaft 24, and an electric link is provided between the engine core generator/motor 280 and the compressor generator/motor 282, for example through a bi-directional motor/generator control unit 284. The electric link is bi-directional meaning that it can adapt to transfer power from the engine shaft 16 to the compressor shaft 24 and vice versa, so that excess power from the compressor shaft 24 can be transferred to the engine shaft 16 when appropriate. The driving engagement between the engine shaft 16 and compressor shaft 24 is accordingly provided by the engine core generator/motor 280, the compressor generator/motor 282 and the electric link therebetween, and the power transfer through the electric link allows for a variation in the speed ratio between the compressor shaft 24 and engine shaft 16, as required.

Figure 5:
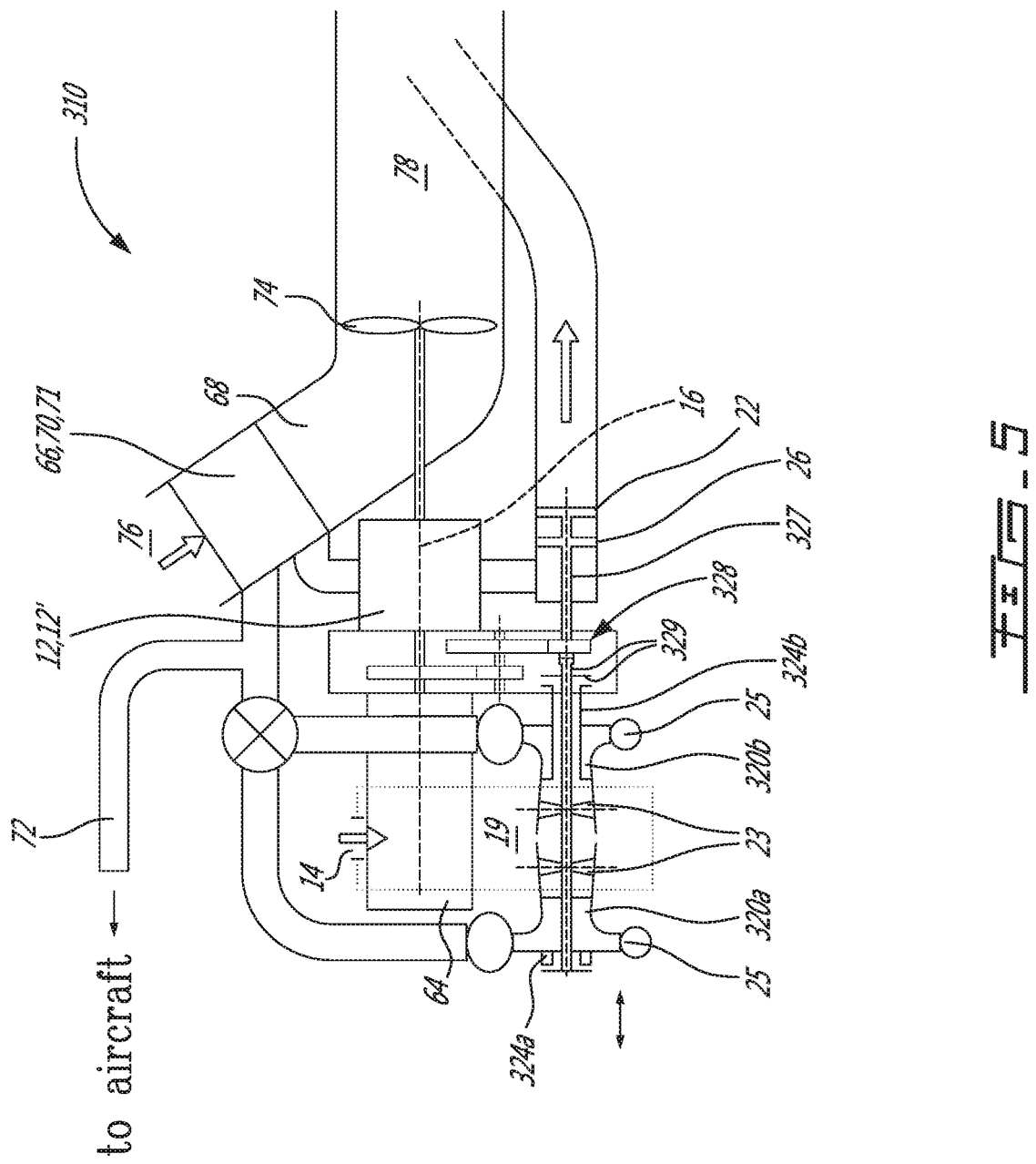
FIG. 5 is a schematic view of an auxiliary power unit in accordance with another particular embodiment.

FIG. 5 shows an auxiliary power unit 310 in accordance with another embodiment, where elements similar to that of the embodiment of FIG. 1 are identified with the same reference numerals and will not be further described herein.

In this embodiment, separate compressors 320a, 320b are provided for ground and flight modes, with both compressors 320a, 320b communicating with the bleed air duct 72 and with the inlet of the engine core 12'. The ground mode compressor 320b is designed for moderate pressure ratio and the flight mode compressor 320a is designed for high altitude requirements. The engine shaft 16 is drivingly engaged to the turbine shaft 327, to which the rotors of the turbines 26, 22 are connected, through the transmission 328, for example with a fixed speed ratio therebetween. Each compressor 320*a*, 320*b* is provided on an independently rotatable compressor shaft 324*a*, 324*b*. Each compressor shaft 324*a*, 324*b* is selectively engageable with the turbine shaft 327 (and accordingly, with the engine shaft 16) through a clutch system 329, for example included as part of the transmission 328. The clutch system 329, through selective engagement of one of the compressor shafts 324*a*, 324*b* with the turbine shaft 327, allows for the selection of the appropriate compressor 320*a*, 320*b* to drive, for example based on an input from the aircraft control systems indicating the status of the aircraft. Accordingly, in this case each compressor 320*a*, 320*b* varies its speed ratio with respect to the engine shaft 16 through engagement and disengagement of the clutch system 329.

When the flow-pressure requirements of the engine core 12' and the aircraft cannot be efficiently reconciled to a single compressor, an additional load compressor can be provided to provide the bleed air for the aircraft, so that the outlet of this load compressor communicates with the bleed air duct without communicating with the inlet of the engine core 12', and the outlet of the supercharger compressor communicates with the inlet of the engine core 12' without communicating with the bleed air duct. One of the two compressors may be driven without variable speed operation (for example, through a geared engagement with the engine shaft 16) while the other compressor may have variable speed capability with respect to the engine core, including, but not limited to, such as shown in the embodiments of FIGS. 1 and 3-5. Alternately, both compressors may have variable speed capability with respect to the engine shaft 16, including, but not limited to, such as shown in the embodiments of FIGS. 1 and 3-5.

Figure 6:
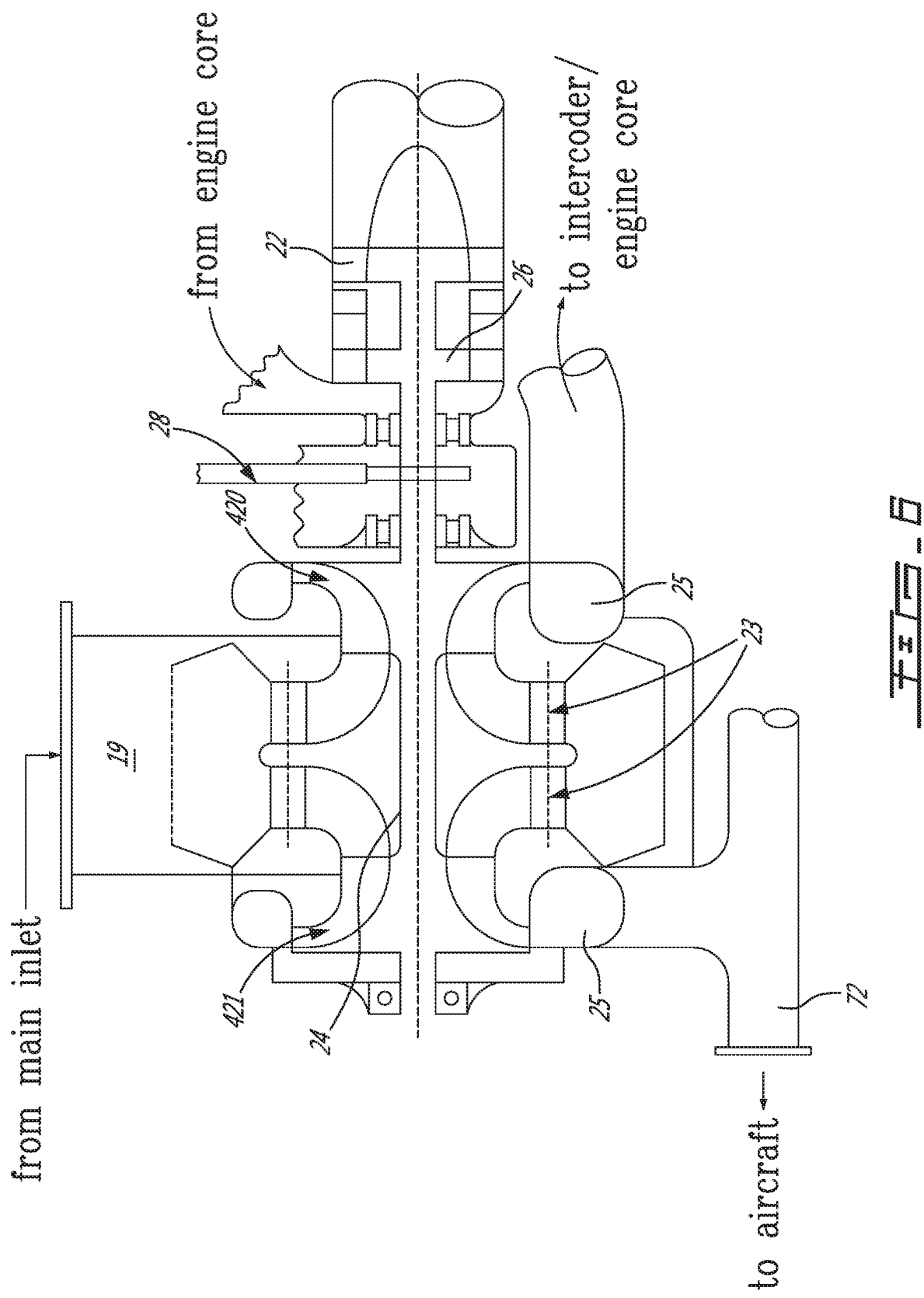
FIG. 6 is a schematic cross-sectional view of part of an auxiliary power unit showing compressor and turbine sections in accordance with another particular embodiment which may be alternately used in any of the above auxiliary power units.

Referring to FIG. 6, a particular embodiment for the separate supercharger and load compressors is shown. In this embodiment, the supercharger compressor 420 providing the compressed air to the engine core 12' and the bleed compressor 421 providing the compressed air to the aircraft are connected to the same shaft 24, which also receives the turbines 26, 22 of the turbine section. The compressor inlets can be connected to a common plenum 19, as shown, or can be each connected to a respective plenum; the plenum(s) 19 are connected to the main inlet 14. In a particular embodiment, such a configuration allows for accommodating different functional requirements for the supercharging flow (to the engine core 12') and the aircraft flow (to the bleed duct 72). Variable speed drive between the compressor shaft 24 and the engine shaft 16 may be implemented.

Figure 7:
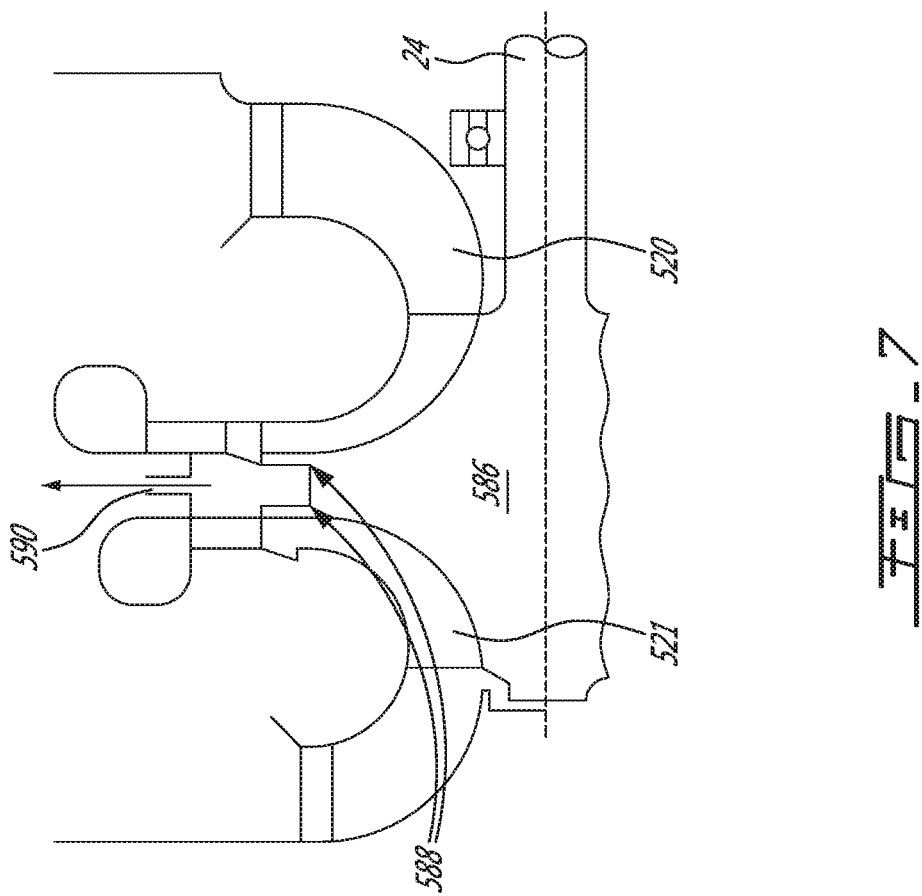
FIG. 7 is a schematic cross-sectional view of a compressor section in accordance with another particular embodiment which may be alternately used in any of the above auxiliary power units.

Referring to FIG. 7, another particular embodiment for the separate supercharger and load compressors is shown. The supercharger compressor 520 providing the compressed air to the engine core 12' and the bleed compressor 521 providing the compressed air to the aircraft are arranged on both sides of a single rotor 586, which in a particular embodiment is manufactured by forging. The rotor 586 is received on the compressor shaft 24. Tip seals 588 (e.g. labyrinth or fin type air seals) with a low pressure "sink" (exhaust) 590 below either of the impeller delivery pressures (e.g. to ambient) are arranged at the impeller tips to prevent interference between the two compressors 520, 521 which might result in premature stall or surge, when the two sides are operating at different pressures. Variable speed drive between the compressor shaft 24 and the engine shaft 16 may be implemented, for example, in accordance with any of the embodiments of FIGS. 1 and 3-5.

Figure 8:
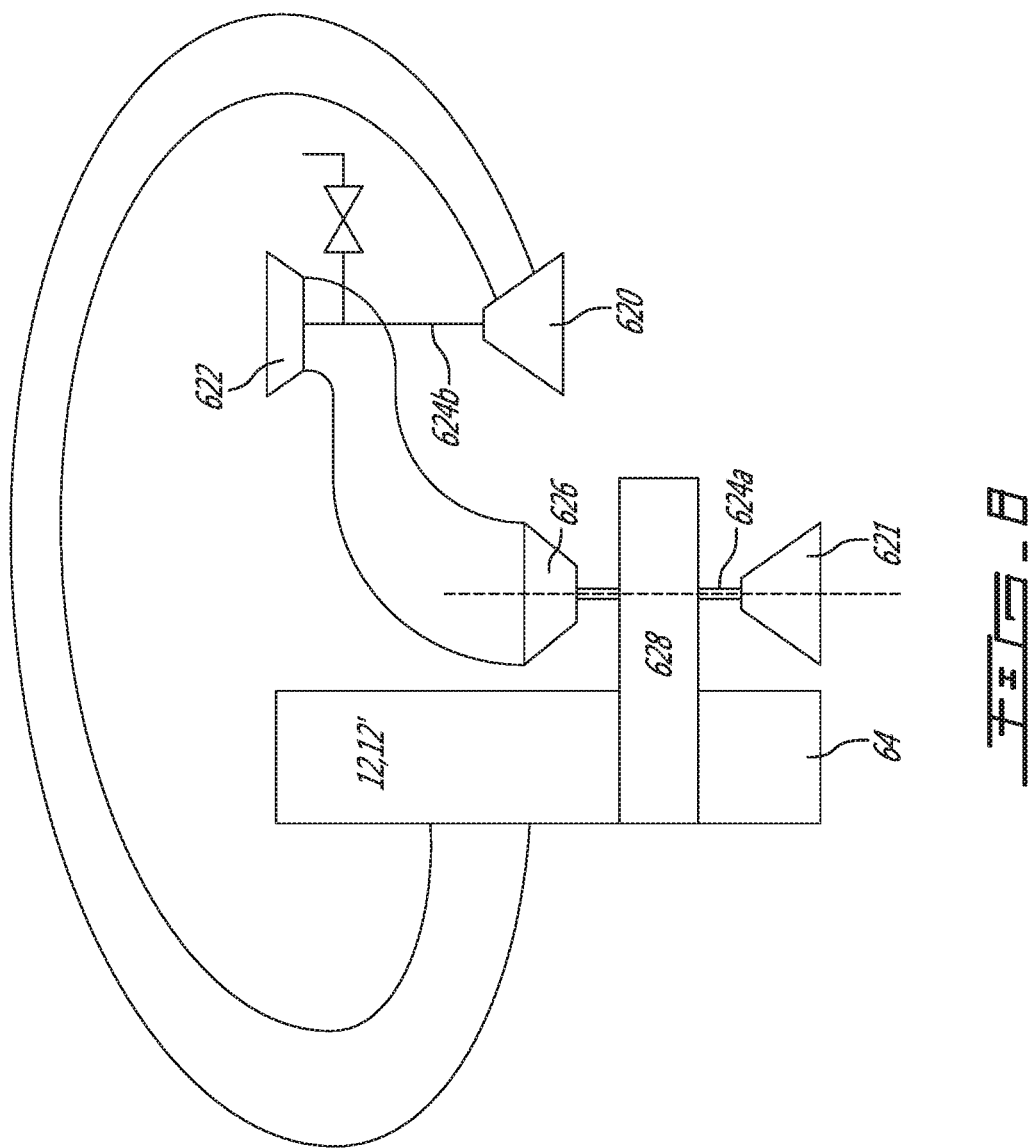
FIG. 8 is a diagram of compressor and turbine configuration in accordance with another particular embodiment which may be alternately used in any of the above auxiliary power units.
Figure 9:
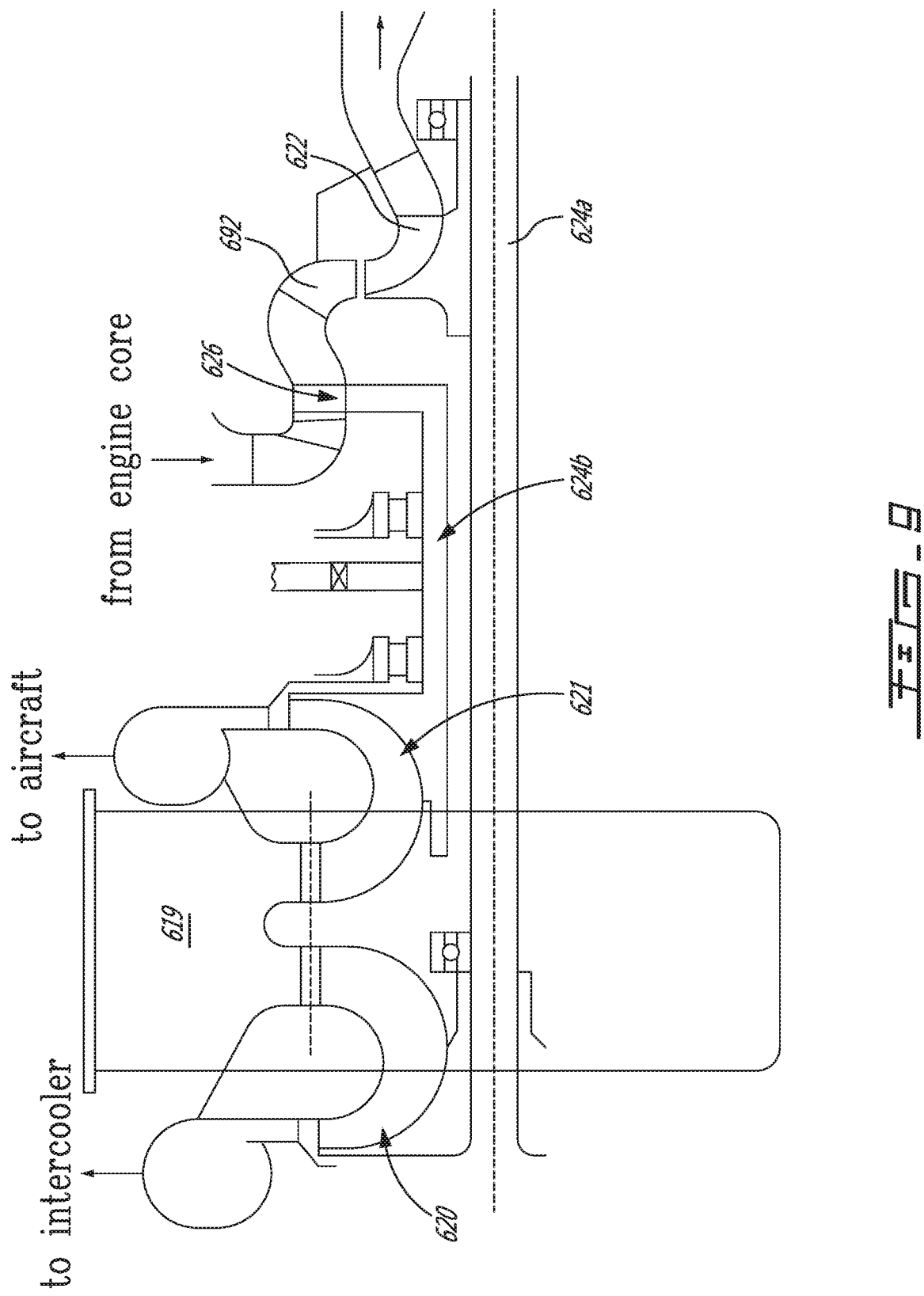
FIG. 9 is a schematic cross-sectional view of the compressor and turbine configuration of FIG. 8.

Referring to FIGS. 8-9, another particular embodiment for the separate supercharger and load compressors is shown. The supercharger compressor 620 is mounted on a separate shaft 624*b* with the second stage (e.g. pressure) turbine 622, and the first stage turbine 626 drives the bleed compressor 621 through a first stage shaft 624*a* compounded with the engine core 12' through a transmission 628. In a particular embodiment, such a configuration allows for the turbocharger 620 to find its own match point and possibly eliminate the need for variables on one of the compressors 620, 621. Variable nozzle geometry (e.g. variable area turbine vanes 692, see FIG. 9) could be introduced on the second stage turbine 622 to improve controllability of the degree of supercharge. In a particular embodiment, such a configuration allows for the speed of the second stage turbine 622 to be selected independent of the requirements for the first stage turbine 626. As can be seen in FIG. 9, in a particular embodiment the turbocharger shaft 624*b* is concentric with the shaft 624*a* of the load compressor 621, and a common inlet plenum 619 is provided for both compressors 620, 621. It is understood that although the second stage turbine 622 is shown as a radial turbine, it could alternately be an axial turbine.

Variable speed drive between the turbocharger shaft 624*b* and the engine shaft 16 and/or between the load compressor shaft 624*a* and the engine shaft 16 may be implemented, for example, in accordance with any of the embodiments of FIGS. 1 and 3-5. Alternately, a continuously variable transmission (e.g. similar to that of FIG. 3) or an electric link (e.g. similar to that of FIG. 4) can be implemented between the load compressor shaft 624*a* and the turbocharger shaft 624*b*, for example to improve the range of delivery conditions available.

In a particular embodiment, the auxiliary power units 10, 110, 210, 310 discussed above are particularly, although not exclusively, suitable to be used during flight, since their thermal efficiency is much more comparable to that of the main engines (prime mover engines) than conventional gas turbine engine auxiliary power units. In a particular embodiment, the auxiliary power unit 10, 110, 210, 310 is operated full time during flight, with no bleed air or shaft power extraction from the main engine(s). This may allow for the main engine(s) to be optimized for propulsion only, which may lead to additional fuel saving. In another embodiment, the auxiliary power unit 10, 110, 210, 310 is operated only when it is in flight regimes where the efficiency is superior to that of the main engine(s) and fuel can be saved, and the main engine(s) are used for bleed air and shaft power extraction at times where the auxiliary power unit 10, 110, 210, 310 is not. Such a configuration may allow for a mitigation of system failures, by reverting back to conventional main bleed and extraction upon failure of the auxiliary power unit.

Gas turbine propulsion engines (main engines) have aerothermodynamic design points typically at high altitude, high normalized power conditions, such as cruise or climb. The effects of secondary bleed and power extractions can be allowed for at the design point type conditions and the result is that the secondary extracted power is obtained at fairly high thermal efficiency in these regimes. However, when the loads deviate from the design values or the main engine operates at part load, for example during descent or if the mission does not permit the optimal cruise altitude to be obtained, the secondary power is obtained at much reduced thermal efficiency. Bleed air may be throttled to match pressure requirements at lower altitudes. Also at lower power settings switching to high stage bleed occurs, which represents a further energy loss. The compressor running of the main engine must often be "matched" in a non-optimal location for efficiency to take into account the possibility of abnormal shaft power overloads and avoid engine surge. This margin builds in some inefficiency relative to the best possible design based on propulsion demands only.

Several studies have been conducted on the mission fuel burn effects of the secondary power off-take from the main engine and a typical conclusion is that the secondary power extractions are responsible for ROM 5% fuel burn.

Typical traditional gas turbine engine auxiliary power units have a thermal efficiency that does not come close to the thermal efficiency of the main engine at high power, and accordingly use of such auxiliary power units to generate the secondary power during flight would increase rather than decrease mission fuel. Attempts to improve the efficiency of the gas turbine engine auxiliary power unit are confounded by turbo-machinery component size effects such as blade size limitations, tip clearance losses, Reynolds effects and increases in complexity, which are cost prohibitive and limit the practical increase in cycle pressure ratio. Moreover, the secondary power extractions on the main engines at high altitude represent a high normalized power as compared to the low air density and relatively poor inlet recovery at a typical gas turbine engine auxiliary power unit inlet. Consequently attempts to size the gas turbine engine auxiliary power unit to provide adequate power leads to an engine which is significantly larger than a conventional sized gas turbine engine auxiliary power unit, further making the option unattractive.

By contrast, the present auxiliary power units 10, 110, 210, 310 have properties allowing them to potentially overcome these difficulties. For example, in a particular embodiment the cycle thermal efficiency of the auxiliary power unit with an engine core 12' including one or more Wankel rotary engine(s) 12 can be comparable to that of the main engine, so the penalty for moving the secondary power source to the auxiliary power unit 10, 110, 210, 310 is significantly reduced. In addition, in a particular embodiment, the supercharging can be stepped up with altitude (through the variable speed ratio between the compressor shaft and the engine shaft) to maintain a high density core. Moreover, in a particular embodiment the auxiliary power unit 10, 110, 210, 310 has specific cost characteristics which are more attractive than that of a small gas turbine engine of equivalent efficiency.

For example, when the aircraft flies in icing conditions, it often requires additional bleed and/or electrical loading; in a particular embodiment, auxiliary power unit 10, 110, 210, 310 can take charge of this additional bleed and/or electrical loading due to its thermal efficiency close to that of the main engine(s). Accordingly, by not imposing these additional loads on the main engine(s), the main engine(s) can be more efficient or can be optimized differently. This may possibly allow further weight saving in the overall system design.

The auxiliary power unit 10, 110, 210, 310 may be used with one or more main engine(s) configured as gas turbine engines, or as compound engine assemblies, for example of a type similar to the auxiliary power unit but suitably sized to provide adequate power.

In a particular embodiment, the aircraft has a secondary power system supported full time in flight by a one or more of the auxiliary power unit 10, 110, 210, 310, such as to avoid compromising main engine performance for bleed air and/or power extraction.

In a particular embodiment, as the altitude rises, the super-charge pressure (for the engine core 12') and the delivery pressure requirement to the aircraft environmental control system (ECS) both rise such that use of a common compressor for load and supercharger air may be possible. The compressor variable inlet guide vanes are regulated to match the aircraft pneumatic system pressure requirement. Fuel air ratio in the rotary engine is controlled to provide governed speed operation However, regulation of the variable inlet guide vanes in a compressor having a fixed speed ratio with respect to the engine core may not achieve the range required with acceptable efficiency for the pressure ratio range requirements during variation from ground ECS ventilation operation to high altitude pressurization. In ground operation the required pressure ratio to ambient for ECS operation is typically 2-3 whereas in flight pressure ratios of 8 or more may be required to provide cooling, ventilation and pressurization. In a particular embodiment, the variable speed ratio provided between the compressor and the engine core in the auxiliary power unit 10, 110, 210, 310 allows to reach the required range with acceptable efficiency. In addition or in the alternative, the use of a variable speed generator enabling to change the speed of the engine core 12' to better align to the required loads may be used. Such may allow for the auxiliary power unit to be operated full time during flight, thus allowing all of the secondary power to be obtained from the auxiliary power unit without the need to involve the main engine(s).

In a particular embodiment and as an alternative having the auxiliary power unit 10, 110, 210, 310 operating full time, the auxiliary power unit 10, 110, 210, 310 is operated part time as an efficient power source when the mission conditions are particularly inefficient for main engine secondary power extraction. In this case, if there is an auxiliary power unit failure, or use of the auxiliary power unit is not needed, the main engine supports the pneumatic system and electrical system. In a particular embodiment, elements such as pre-coolers to deal with high temperature compressor delivery air, which might be discarded with a full time auxiliary power unit, are retained for the part-time operation. Margins might be reduced if the operation without a part time auxiliary power unit is infrequent.

Large inefficiencies in main bleed extraction typically occurs when the propulsion engines are unable to meet the system pressure demand on mid stage bleed and must switch to high stage. The high stage bleed generally exceeds the system design requirement and must be both throttled and cooled to match what is required by the aircraft. This may represent a comparatively large waste of energy. It can occur during cruise at very high altitudes and low weight or during hold, descent, and idle/taxi situations. For some common short range operations non-optimal descent and idling fuel burn can be 20% of the total mission fuel so even a modest improvement could be significant in aircraft terms.

Figure 10:
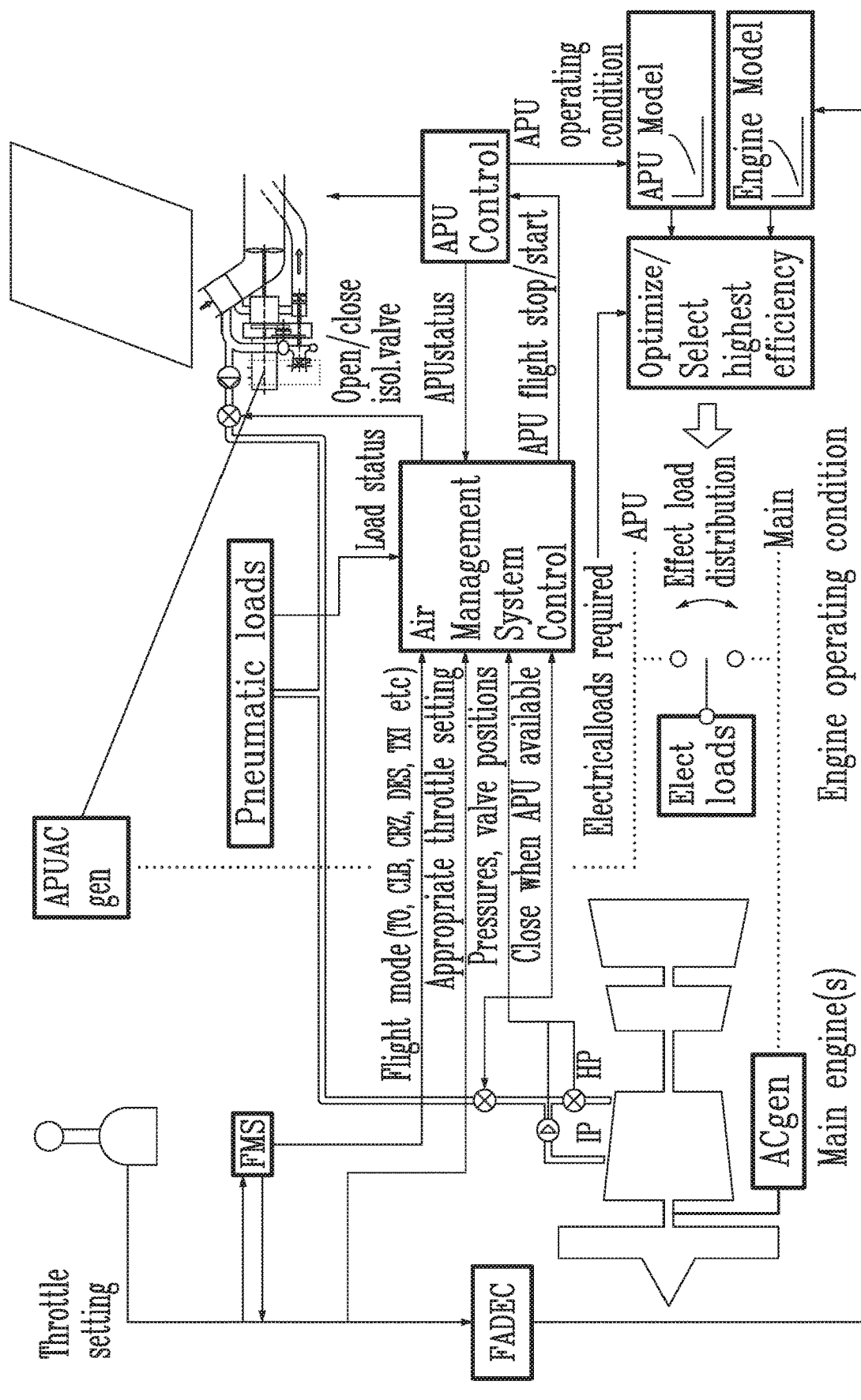
FIG. 10 is a diagram of a system for integrating an auxiliary power unit such as any of the above auxiliary power units for part-time in-flight use, in accordance with a particular embodiment.

FIG. 10 shows a diagram of a system allowing a part time use of the auxiliary power unit 10, 110, 210, 310 during flight, in accordance with a particular embodiment. Sensing devices on the main engine bleed valves or pressures determine when the switch from intermediate to high stage bleed occurs. The aircraft has an overall Air Management System Control (AMSC) which can communicate with the airframe Flight Management System (FMS), the engine full authority digital electronics control (FADEC), the auxiliary power unit (APU), the ECS and other pneumatic power users as well as the APU. Communicating between the elements can be by ARINC or a similar digital system. High speed communication links may optionally be provided. In general the arrows in FIG. 10 show the direction and information to be communicated between the elements of the system.

The following indicates the procedure during descent and the roles of the equipment in FIG. 10, with respect to pneumatic power and descent operation, in accordance with a particular embodiment.

The main engine throttles are retarded to initiate descent. Engine pressures fall and the air valves on the engine switch to high stage bleed. This change in state is recognized by the AMSC which commands the APU to start. The APU is expected to start within a few seconds, however in normal circumstances it may be beneficial for durability and oil consumption to allow for a short warm up period before loading the APU.

A check valve on the APU protects the APU from high systems pressures above the capability of the APU compressor.

Once the APU is warmed up and ready to accept load it sends a "ready" status to the AMSC which then can open the APU isolation valve and begin to progressively close main engine isolation valves until the system pressure falls enough to allow the APU check valve to open and allow the APU to deliver air to the pneumatic system. This process continues until the APU reaches full pneumatic load or the main engine bleed valves are completely shut.

Should the main engine be throttled up again due to a break in the descent it may be economical to leave the APU supporting the pneumatic system. A hysteresis loop in the control logic can be introduced to prevent unnecessary shuttling between the two modes and multiple APU start/shutdowns.

Alternatively the FMS can indicate the aircraft is in a descent mode and have the AMSC leave the APU powering the pneumatic system for the course of the descent. In this case it may be possible to avoid the use of high stage bleed.

Information from the FMS can also be used to anticipate the descent and have the APU started and ready to accept load before the main throttles are retarded. In a particular embodiment, any period with the APU idling and main engines supporting the pneumatic system is minimized, as this represents a fuel penalty. The process is well adapted to continuous descent approach (CDA).

In a particular embodiment, once the APU is on line for descent, the APU supports the pneumatic system for the remainder of the flight, including landing and taxi in.

In the event of a "go around" maximum capability is available from main engines since the bleeds and extractions will have been minimized by the part time APU.

The following indicates the taxi-out (TXI), take-off (TO) and climb (CLB) operation of the equipment in FIG. 10, in accordance with a particular embodiment.

During taxi the APU is supporting the pneumatic system and the main engine bleed isolation valves are closed. After the engine spools up the main engine bleed valve control system determines the intermediate stage bleed that can meet system pressure requirements. After a suitable delay (to allow for take-off and initial climb throttle transients) the AMSC progressively opens the IP valve. At some point the APU check valve closes and the APU may then proceed to shut down.

The AMSC can annunciate the process to the APU controller so it may arm the APU system to expect a pneumatic transient if required. The final transfer and decision to shut the APU down may be based on time since the IP port was opened, or with the aid of the FMS indicating the aircraft has completed take-off and is now in "climb" mode.

In a particular embodiment, the management of the APU is based on an optimisation of the management of the pneumatic load, since this is subject to throttling and cooling losses in addition to basic thermal efficiency at the point of extraction considerations.

Once the APU is active it is possible for it to adopt some of the electrical load. Since the electrical efficiencies are usually much more consistent than the pneumatic systems, in a particular embodiment the main decision in prioritizing which source to use for electrical power is the thermal efficiency of the power extraction. In a particular embodiment the system includes a secondary power system optimizer which reads the main engine and APU operating conditions and with the aid of built in models of main engine and APU performance aims to select the highest efficiency to obtain the overall most efficient distribution of power between the main engine and APU generators.

The main engine and APU operating information is collected from the FADEC and APU control. This data is input to thermodynamic or other models within the optimizing control to determine thermal efficiency matrices at and around the current condition. The required loads are input to the electrical distribution system and to the optimizer. The optimization routine indicates where load should be placed or removed to get to optimum conditions and communicates back to the electrical distribution system to effect the appropriate distribution.

In a particular embodiment, in the event of APU or system failure, the part time APU mode is cancelled and the system functions as a full time main engine supported secondary power system with some increase in overall fuel consumption. Consideration has to be given to the approach for any credit taken for take-off and maximum continuous thrust with the reduced extractions available with the part time APU.

In the case of an all-electric APU the requirements are simplified since the compressor design must solely satisfy the requirements of the engine core. In this case the flow size of the compressor is reduced and the function is replaced by a larger generator which generates electric power for consumption somewhere else on the aircraft, typically in a dedicated ECS machine compressor. In this case the APU can be simplified by deleting the diverter and load valves (not shown here) associated with managing the variation in aircraft bleed.

For a full time application of an all-electric APU with no main engine generator, operation of the APU is self-governing and the APU control responds to govern closed loop to a scheduled rotor speed as required.

For a part time application of an all-electric APU which can share with main engine mounted generators or starter generators, the electrical load optimization routine based on comparing main engine and APU thermal efficiency conditions via locally executed thermal models can be employed to distribute the load most efficiently. Typically when the main engines are at part power and the thermal efficiency of the APU is calculated to be better the system will transfer the maximum amount of load to the APU.

In other instances if take-off and climb/maximum continuous main engine power are indicated by the throttle and confirmed by the FMS then it may be preferable to transfer load to the APU to maximize main engine thrust or minimize turbine temperature on the main engine as desired.

Once the FMS indicates that stable flight is anticipated at efficient engine conditions for some time the APU is shut down to conserve fuel unless there is a need to bring it on line to act as an emergency generator.

The thermal models may be contained in both the main engine and APU controls and send a continuously updated thermal efficiency vs power extraction characteristic to the secondary power system optimizer which makes the loading assignment or the models may be within the optimizer with input parameters derived from the main engine and APU controls data.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. An auxiliary power unit (APU) for an aircraft, comprising:
   an engine core that includes an internal combustion engine having an air intake port and an exhaust port;
   an engine shaft connected to the internal combustion engine to be driven by the internal combustion engine;
   a variable transmission connected to the engine shaft;
   a compressor that is one of selectively connectable to and connected to the variable transmission, the compressor having an air inlet and an air outlet, the air outlet being fluidly connected to the intake port of the internal combustion engine;
   a turbine connected to the variable transmission, the turbine having an exhaust gas inlet in fluid communication with the exhaust port of the internal combustion engine and an exhaust gas outlet in fluid communication with the exhaust gas inlet; and
   a bleed air conduit fluidly connected to the air outlet of the compressor and being fluidly connectable to the aircraft.

2. The APU of claim 1, comprising a duct and a heat exchanger in the duct, the air outlet of the compressor being fluidly connected to the intake port of the internal combustion engine via the heat exchanger positioned fluidly between the air outlet and the intake port, and the exhaust gas outlet of the turbine being fluidly connected into the air duct at a point that is fluidly downstream of the heat exchanger in the air duct.

3. The APU of claim 2, wherein the duct is a first duct, the exhaust gas outlet of the turbine fluidly connects to the point via a second duct, the second duct is angled at the point relative to the first duct such that gas flow entering the first duct from the second duct includes a directional component that is parallel to and in a same direction as a direction of gas flow through the first duct at the point.

4. The APU of claim 2, comprising a fan disposed in the air duct fluidly between the heat exchanger and the point, the fan being connected to the internal combustion engine.

5. The APU of claim 4, wherein the fan is connected to the engine shaft.

6. The APU of claim 1, wherein the turbine is a first turbine, and comprising a second turbine connected to the variable transmission and having an exhaust gas inlet in fluid communication the exhaust port of the internal combustion engine.

7. The APU of claim 6, wherein:
   the APU includes a bleed air conduit fluidly connectable to a pneumatic load of an aircraft;
   the compressor is a first compressor;
   the APU includes a second compressor that is one of connected to and selectively connectable to the variable transmission, the second compressor having an air inlet and an air outlet; and
   the air outlet of the second compressor is fluidly connected to at least one of:
   the intake port of the internal combustion engine, and
   the bleed air conduit.

8. The APU of claim 7, wherein the air outlet of the second compressor is fluidly connected to one of the intake port of the internal combustion engine and the bleed air conduit, the one being the bleed air conduit.

9. The APU of claim 8, wherein the first compressor is defined by one side of a rotor and the second compressor is defined by another side of the rotor.

10. The APU of claim 8, wherein the first compressor is configured to output a first pressure ratio and the second compressor is configured to output a second pressure ratio that is different from the first pressure ratio.

11. The APU of claim 8, comprising a clutch system, the first compressor being selectively connectable to the variable transmission via the clutch system, and the second compressor being selectively connectable to the variable transmission via the clutch system.

12. The APU of claim 11, wherein the first compressor is connectable to the variable transmission via the clutch system while the second compressor is disconnected from the variable transmission via the clutch system.

13. The APU of claim 11, wherein the second compressor is connectable to the variable transmission via the clutch system while the first compressor is disconnected from the variable transmission via the clutch system.

14. The APU of claim 7, wherein the first turbine has a different configuration than the second turbine.

15. The APU of claim 7, wherein the exhaust gas inlet of the second turbine is fluidly downstream of and in fluid communication with the exhaust gas outlet of the first turbine.

16. The APU of claim 1, wherein the second turbine is coaxial with the first turbine and connected to the variable transmission via the compressor shaft.

17. The APU of claim 1, wherein the variable transmission includes a first electric motor/generator mechanically connected to the engine core and a second electric motor/generator electrically connected to the first electric motor/generator, the compressor and the turbine being mechanically connected to the second electric motor/generator.

18. An auxiliary power unit (APU) for an aircraft, comprising:
   an engine core that includes an internal combustion engine having an air intake port and an exhaust port;
   an engine shaft connected to the internal combustion engine to be driven by the internal combustion engine;
   a variable transmission connected to the engine shaft;
   a compressor that is one of selectively connectable to and connected to the variable transmission, the compressor having an air inlet and an air outlet, the air outlet being fluidly connected to the intake port of the internal combustion engine;
   a turbine connected to the variable transmission, the turbine having an exhaust gas inlet in fluid communication with the exhaust port of the internal combustion engine and an exhaust gas outlet in fluid communication with the exhaust gas inlet;
   a duct and a heat exchanger in the duct, the air outlet of the compressor being fluidly connected to the intake port of the internal combustion engine via the heat exchanger positioned fluidly between the air outlet and the intake port, and the exhaust gas outlet of the turbine being fluidly connected into the air duct at a point that is fluidly downstream of the heat exchanger in the air duct; and a fan disposed in the air duct fluidly between the heat exchanger and the point, the fan being connected to the internal combustion engine.

19. An auxiliary power unit (APU) for an aircraft, comprising:

an engine core that includes an internal combustion engine having an air intake port and an exhaust port;

an engine shaft connected to the internal combustion engine to be driven by the internal combustion engine;

a variable transmission connected to the engine shaft;

a compressor that is one of selectively connectable to and connected to the variable transmission, the compressor having an air inlet and an air outlet, the air outlet being fluidly connected to the intake port of the internal combustion engine;

a turbine connected to the variable transmission, the turbine having an exhaust gas inlet in fluid communication with the exhaust port of the internal combustion engine and an exhaust gas outlet in fluid communication with the exhaust gas inlet; and a duct and a heat exchanger in the duct, the air outlet of the compressor being fluidly connected to the intake port of the internal combustion engine via the heat exchanger positioned fluidly between the air outlet and the intake port, and the exhaust gas outlet of the turbine being fluidly connected into the air duct at a point that is fluidly downstream of the heat exchanger in the air duct, wherein the duct is a first duct, the exhaust gas outlet of the turbine fluidly connects to the point via a second duct, the second duct is angled at the point relative to the first duct such that gas flow entering the first duct from the second duct includes a directional component that is parallel to and in a same direction as a direction of gas flow through the first duct at the point.

* * * * *